United States Patent
Lewandowski et al.

(10) Patent No.: US 10,957,202 B2
(45) Date of Patent: Mar. 23, 2021

(54) VEHICLE SAFETY DEVICE WITH WARNING ZONES

(71) Applicant: comnovo GmbH, Dortmund (DE)

(72) Inventors: Andreas Lewandowski, Dortmund (DE); Ron Winkler, Wuppertal (DE); Volker Köster, Dortmund (DE); Dominik Gerstel, Schwerte (DE)

(73) Assignee: Comnovo GmbH, Dortmund (DE)

( * ) Notice: Subject to any disclaimer, the term of this patent is extended or adjusted under 35 U.S.C. 154(b) by 0 days.

(21) Appl. No.: 16/318,674

(22) PCT Filed: Jul. 14, 2017

(86) PCT No.: PCT/EP2017/067931
§ 371 (c)(1),
(2) Date: Jan. 17, 2019

(87) PCT Pub. No.: WO2018/015315
PCT Pub. Date: Jan. 25, 2018

(65) Prior Publication Data
US 2019/0287405 A1    Sep. 19, 2019

(30) Foreign Application Priority Data
Jul. 19, 2016   (DE) .................. 10 2016 113 312

(51) Int. Cl.
*G08B 21/00*   (2006.01)
*G08G 1/16*   (2006.01)
(Continued)

(52) U.S. Cl.
CPC .............. *G08G 1/166* (2013.01); *F16P 3/147* (2013.01); *G08G 1/16* (2013.01); *H04W 4/40* (2018.02)

(58) Field of Classification Search
CPC ...... G01C 21/165; G01C 21/16; G01C 21/32; G01C 21/3461; G01C 21/3492;
(Continued)

(56) References Cited

U.S. PATENT DOCUMENTS 5,208,756 A      5/1993 Song
5,455,557 A *  10/1995 Noll ..................... B60D 1/36
                                                       280/477
(Continued)

FOREIGN PATENT DOCUMENTS

DE      198 45 568 A1    10/1999
DE      102 55 797 A1     6/2004
(Continued)

OTHER PUBLICATIONS

International Search Report (ISR) (PCT Form PCT/ISA/210) in International Patent Application No. PCT/EP2017/067931 dated Oct. 12, 2017.
(Continued)

*Primary Examiner* — Daniel Previl
(74) *Attorney, Agent, or Firm* — BakerHostetler

(57) ABSTRACT

A vehicle safety device for warning persons in traffic has an antenna unit having at least a first antenna, a second antenna, and a third antenna. The antennas are mounted spaced apart from each other in a predetermined spatial relationship at predetermined positions on a vehicle to be safe-guarded. Each antenna generates an electromagnetic field. The vehicle safety device also has a control unit in electrical communication with the antenna unit, which defines a warning zone for the vehicle and determines whether a warning module matched to the antenna unit is located within the warning zone.

21 Claims, 11 Drawing Sheets

(51) Int. Cl.
*H04W 4/40* (2018.01)
*F16P 3/14* (2006.01)

(58) Field of Classification Search
CPC ........... G06Q 10/0631; G06Q 10/0635; G06Q 10/06375; G06Q 10/103; G06Q 20/065; G06Q 20/22; G06Q 20/40; G06Q 30/0201; G06Q 30/08; G06Q 40/00; G06Q 40/04; G06Q 50/188; G06Q 40/08; H04W 16/28; H04W 64/003; H04W 72/082; H04W 84/18; H04W 4/40; H04W 16/14; H04W 28/22; H04W 56/0085; H04W 64/00; H04W 72/10; H04W 74/04; H04W 84/00; H04W 8/245; B60W 2550/30; B60W 2550/304; B60W 30/0956; B60W 30/12; B60W 30/18163; B60W 2050/0071; B60W 2050/143; B60W 2050/146; B60W 2550/14; B60W 2550/22; B60W 2550/404; B60W 30/06; B60W 30/18; B60W 50/14; G08G 1/096716; G08G 1/096783; G08G 1/166; G08G 1/0104; G08G 1/09623; G08G 1/096725; G08G 1/096741; G08G 1/096758; G08G 1/096791; G08G 1/168; G08G 1/20; G08G 1/205; G08G 1/095; G08G 1/097; G08G 1/161; H04L 67/12; H04L 67/10; H04L 69/08; G05D 1/0088; G05D 2201/0213; G05D 1/0276; G05D 1/0061; G06F 16/29; B28C 5/422; B28C 7/02; B28C 7/028; B28C 9/00; B60P 3/03; B60Q 9/00; B60Q 9/008; B60Q 1/525; B60Q 5/006; F21S 8/086; F21W 2131/103; G01M 17/00; G01S 11/06; G01S 13/931; G01S 2013/9314; G01S 2013/93272; G01S 2013/93274; G01S 5/12; G01S 13/003; G01S 13/0209; G01S 13/87; G01S 13/88; G01S 19/49; G01S 2013/9315; G01S 2013/9317; G01S 2013/932; G01S 2013/93271; G01S 2013/93275; G06K 9/00288; G06K 9/00348; G06N 3/04; G06N 3/08; G07C 5/008; G08C 17/02; G10L 25/51; H01Q 1/04; H01Q 1/1271; H01Q 1/1285; H01Q 1/2291; H01Q 1/246; H01Q 1/44; H01Q 21/28; H01Q 3/46; H01Q 19/09; H01Q 1/243; H01Q 1/3233; H01Q 1/364; H01Q 21/26; H01Q 21/29; H01Q 25/005; H01Q 3/01; H01Q 3/14; H01Q 3/20; H01Q 3/40; H01Q 3/44; H01Q 9/04; H04B 17/309; H04B 1/3822; H04B 7/15; H04B 17/318; Y04S 10/54; B66F 17/00; E05F 15/40; E05F 15/43; E05F 15/73; E05Y 2400/54; E05Y 2400/85; E05Y 2800/00; E05Y 2900/546; F21V 23/045; G01V 3/088; G06T 17/05

USPC .. 340/425.5, 436, 901–903, 10.1, 10.5, 928, 340/933, 426.1, 439, 463, 5.2, 5.64, 539.1
See application file for complete search history.

(56) References Cited

U.S. PATENT DOCUMENTS

| | | | | |
|---|---|---|---|---|
| 5,939,986 | A | * | 8/1999 | Schiffbauer ........... B66C 15/045 299/12 |
| 2005/0046580 | A1 | * | 3/2005 | Miranda-Knapp ......................... G08B 13/1418 340/686.1 |
| 2012/0013453 | A1 | * | 1/2012 | Wyne ..................... B60Q 9/008 340/425.5 |
| 2013/0038320 | A1 | * | 2/2013 | Frederick ........... G01R 33/0206 324/207.13 |
| 2014/0218227 | A1 | * | 8/2014 | Stelzen ................... G01S 7/415 342/104 |
| 2017/0039850 | A1 | * | 2/2017 | Vanden Berg ........... B60Q 9/00 |

FOREIGN PATENT DOCUMENTS

| | | |
|---|---|---|
| DE | 10 2004 047 209 A1 | 3/2006 |
| DE | 10 2004 048 279 A1 | 4/2006 |
| DE | 10 2007 017 188 A1 | 10/2008 |
| DE | 10 2012 016 783 A1 | 3/2013 |
| DE | 10 2013 214 239 A1 | 1/2015 |
| EP | 0 899 583 A2 | 3/1999 |
| WO | 2009/055606 A1 | 4/2009 |
| WO | 2011/151291 A1 | 12/2011 |

OTHER PUBLICATIONS

German Office Action issued in German Patent Application No. 10 2016 113 312.4 dated Feb. 15, 2017.

* cited by examiner ic field, and a control unit connected to the antenna unit, which control unit is implemented to define a warning zone for the vehicle, and by means of the antenna unit, to determine whether a warning module matched to the antenna unit is within the warning zone.

VEHICLE SAFETY DEVICE WITH WARNING ZONES

CROSS-REFERENCE TO RELATED APPLICATIONS

This application is a National Stage of International Patent App. No. PCT/EP2017/067931, filed on Jul. 14, 2017, which claims priority to German Patent App. No. DE 10-2016-113-314.4, filed on Jul. 19, 2016, the disclosures of which are incorporated by reference in their entirety.

FIELD OF THE INVENTION

The invention relates to a vehicle safety device for warning persons in traffic, a safety system having a vehicle safety device of the aforementioned type, a warning module, a vehicle system and a method for warning persons in traffic, a computer program product and a use of an aforementioned vehicle safety device.

BACKGROUND

An aforementioned vehicle safety device and a corresponding warning module are basically known from WO 2011/151291 A1. Disclosed there is a proximity warning system for detecting the proximity of displaceable objects, particularly of persons, to a vehicle having such a proximity warning system.

The disclosed proximity warning system comprises a warning module and a marking module. The marking module, also referred to as a "keeper", is provided to be attached to a vehicle and comprises a transmitting unit for emitting electromagnetic signals and a motion detector which serves to detect a movement of the marking module and to emit presence signals as electromagnetic signals when a movement is detected. The warning module, also referred to as a "beeper", is used to be carried by a person and comprises a receiving unit for the electromagnetic signals emitted by the marking module. Furthermore, the warning module comprises an output unit which outputs a proximity warning depending on the reception of the presence signals emitted by the marking module.

Even though this system already works well and is also used in practice, it has been shown that further improvement is needed. In particular, there is the need for avoiding false warnings, for example, when driving safely past, but at the same time, outputting warnings with an increased vehicle speed or unsafe conditions even at greater vehicle distance, that is, greater distance from keeper to beeper.

SUMMARY OF THE INVENTION

In particular, the avoidance of false warnings is important since outputting frequent false warnings leads to desensitisation of the persons to be protected, and then they tend to no longer be sensitive enough to react to a warning. It should therefore be achieved as much as possible that warnings are only output when they are actually justified.

It is therefore an object of the present invention to provide a vehicle safety device, a safety system, a warning module, a method for warning persons in traffic, a computer program product and a use of the vehicle safety device, which make possible a more accurate determination of a proximity to largely avoid false alarm.

The object is achieved with a vehicle safety device of the type mentioned above for warning persons in traffic, by an antenna unit having at least a first antenna, a second antenna and a third antenna, which are mounted spaced apart from each other and in a predetermined spatial relationship to each other at predetermined positions on a vehicle to be safeguarded and each generating an electromagnetic field, and a control unit connected to the antenna unit, which control unit is implemented to define a warning zone for the vehicle, and by means of the antenna unit, to determine whether a warning module matched to the antenna unit is within the warning zone.

The invention is based on the idea that an avoidance of false alarms is made possible through a more accurate position determination of the warning module, also referred to as a "beeper", by the vehicle safety device, also referred to as "keeper". By providing three antennas mounted spaced apart from each other and in a predetermined spatial relationship with each other at predetermined positions on a vehicle to be safeguarded and each generating an electromagnetic field, the position of the warning module relative to the vehicle safety device is uniquely determinable. If, instead, as known in the prior art, only a single antenna is used, it can indeed be determined whether a beeper is located in the radio range of the antenna and also at which distance the beeper is located to the antenna by measuring the intensity of the field; a clear position, however, can not be determined this way.

The invention is further based on the idea that only knowing the unique position of the warning module relative to the vehicle safety device is not sufficient. Therefore, a warning zone is additionally provided and it is determined by means of the antenna unit whether the warning module is located within the warning zone. The warning zone in this case is not identical to the radio range of the first, second and third antenna, but rather a dedicated region defined for the corresponding vehicle, wherein the warning zone is always covered by at least one electromagnetic field of an antenna, preferably is covered by two, more preferably by all three electromagnetic fields of all three antennas. That is, the warning module can be within the radio range of all three antennas, but outside the warning zone.

The warning module can be portable or stationary. For example, the warning module can be implemented as a beeper carried on the person, and persons to be warned carry such a portable warning module with them. In one variant, the warning module is mounted stationary, for example, at intersections or gate passages in halls in which the corresponding vehicle is used. This is particularly preferred in larger logistics facilities, in which a variety of industrial trucks, such as forklifts, are used. In the case of a stationary warning module, it is then determined whether the vehicle on which the safety device is provided moves toward the stationary obstacle in such a way that this stationary obstacle enters the warning zone. Likewise, the warning module can be mounted on other vehicles. It should be understood that not only can a warning module be provided, but the vehicle safety device according to the invention can also detect a plurality of warning modules and determine whether these warning modules are located within the warning zone.

The warning zone is preferably predefined and adapted to the vehicle and the corresponding environmental conditions, expected hazards and speeds, and the vehicle behaviour. For example, a greater warning zone should be provided when higher speeds or higher braking distances are expected than at low speeds.

According to a first preferred embodiment of the vehicle safety device, the control unit is implemented to determine the position of the warning module within the warning zone relative to the antenna unit. Thus, not only is it determined whether the warning module is within the warning zone, but also where the warning module is located in the warning zone. This information can also be used to avoid false warnings. If it is detected, for example, that the warning module is within the warning zone to the left of the corresponding vehicle in the direction of travel, and it is detected at the same time that the vehicle is turning right in the direction of travel, it is not necessary to output a warning. The accuracy of the position determination is preferably 20 cm, particularly preferably 10 cm. This is achieved by using antennas in the high-frequency range, which operate, for example, in the 2.4 GHz range or in the 4 GHz range up to 200 m range. The antennas are implemented for this purpose as radio-frequency radio antennas. It has been found that antennas that work on the basis of radar technology, infrared technology or RFID technology can barely achieve such accuracies in the application cases.

In principle, the antennas can be implemented as described in WO 2011/151291 A1 and to that extent reference is made in full to the antenna technology described therein.

It is further preferred that the control unit is adapted to define the warning zone as a function of at least one of the following parameters: driving speed, direction of travel, location, vehicle load, time of day, relative speed to the warning module, seat contact switch, steering angle, temperature, vehicle wheel slip, ABS signal.

The vehicle safety device is, for this purpose, preferably equipped with corresponding sensors, or is supplied with corresponding signals of a vehicle control. For this purpose, the vehicle safety device is connected or can be connected to a central vehicle control. It is preferably provided that the warning zone is not static, but rather is adapted or varied depending on one or more of the mentioned parameters. Thus, for example, it is preferred that at a high driving speed, the warning zone is increased in order to take into account the increased braking distance and the reaction time of a driver. The same applies to the vehicle wheel slip or the temperature. For example, if a road surface is wet, the braking distance is also increased and a larger warning zone is preferred. Depending on the direction of travel, it can be provided that the warning zone is increased in this direction of travel and is reduced in directions laterally or opposite to the direction of travel to avoid false alarm. An increased warning zone is also preferred at a higher load of the vehicle. It can be provided that, in the absence of a signal of the contact switch, no warning zone, or a very small warning zone is defined, since then no operator is located on the vehicle seat.

In a further preferred embodiment, the warning zone is defined such that it extends longitudinally forward from the front of the corresponding vehicle and is narrow on vehicle sides. Such a warning zone configuration is based on the fact that the vehicle usually drives straight ahead or drives in a forward direction and driving past persons is not dangerous. Therefore, the warning zone is narrow on the side of the vehicle and elongated in the direction of travel in a forward direction. For example, a ratio in a range from 1.5:1 to 4:1 is preferred here, wherein a value of about 2:1 is particularly preferred. That is, an axial length in the direction of travel of the zone is about twice as long as a width of the zone transverse to the direction of travel, each measured from the vehicle. Furthermore, it is preferred that an axial warning zone length in the direction of travel corresponds approximately to a vehicle length in the direction of travel; a width of the lateral sections of the warning zone preferably corresponds to twice the vehicle width. In many cases, an axial length of the warning zone forward in the direction of travel is about 2 to 2.5 m, while the warning zone extends laterally from the vehicle about 1 to 1.2 m. These values depend on many factors and in particular the field of application. The aforementioned values have proved to be advantageous for the field of logistics and for industrial trucks.

In this case, it is particularly preferred that the warning zone comprises a frontal section which extends in a vertical projection in a substantially rectangular or trapezoidal manner widening in a forward direction. It has been found that such a frontal region is preferred in order to achieve reliable detection of the warning module and to avoid false alarms. A trapezoidal, widening shape for the frontal section is particularly preferred at higher driving speeds and uncertain direction of travel.

Furthermore, it is preferred that the warning zone comprises two side sections, which extend approximately in a range of 30 cm to 2.5 m, preferably 50 cm to 2.5 m from the vehicle to be safeguarded. These values are measured perpendicular to a vehicle longitudinal axis. Such a design make possible safe driving past standing or moving warning modules without a false alarm being triggered.

In a preferred embodiment of the invention, the control unit is adapted to output a warning signal in response to determining that a warning module matched to the antenna unit is located within the warning zone. As a result, the vehicle driver of the vehicle to which the corresponding vehicle safety device is mounted is also informed that a warning module has entered into the warning zone. This gives an operator the ability to react to this risk and to take appropriate countermeasures. The warning signal can be, for example, an audio signal or a visual signal, or a wired or wireless signal, which is output to a warning unit, which is also disposed on the corresponding vehicle or on a control station.

In a further preferred embodiment, the control unit is adapted to be connected to a vehicle control of the vehicle to be safeguarded and to output the warning signal to the vehicle control such that the vehicle is braked. In such a case, it is provided that as soon as a warning module is detected in the warning zone, the vehicle on which the vehicle safety device is mounted is braked. This increases safety. Travelling at excessive speed while the warning module is located in the warning zone is thus avoided.

Furthermore, it is preferred that the control unit comprises a display device by means of which the position of the warning module, which is within the warning zone relative to the antenna unit can be displayed. By means of such a display device, a driver of the vehicle to be safeguarded can recognise where the warning module is located in the warning zone and react accordingly. For example, if a vehicle driver sees that the warning module is in the rear region of the vehicle, he will react particularly cautiously when driving backwards.

According to a further preferred embodiment, the antenna unit comprises a fourth antenna, which is provided to define a safe area. Such an antenna can be used for so-called "muting" and special regions can thereby be defined in which no warning signal is to be output. This is particularly advantageous for an interior of the vehicle to be safeguarded. If a vehicle driver himself carries a warning module with him and enters the vehicle, such a fourth antenna is particularly advantageous in order to avoid detection of the warning module carried by the vehicle driver in the warning zone. This also avoids false alarms.

The object mentioned above is achieved according to a second consideration of the invention in a safety system of the type mentioned above, comprising a vehicle safety device according to at least one of the above-described preferred embodiments of the vehicle safety device according to the first consideration of the invention, by at least one warning module, which is matched to the antenna unit of vehicle safety device, wherein the warning module comprises a control unit and an antenna, which is matched to the antenna unit of the vehicle safety device, and wherein the warning module is implemented to output a warning signal when it is determined that the warning module is located within the warning zone. The warning module can be portable, stationary or mounted on a vehicle. A portable warning module is also referred to as a "beeper" while a stationary warning module is referred to as an "anchor". If the warning module is mounted on a vehicle that is also equipped with the vehicle safety device according to the first consideration of the invention, this also allows a vehicle-to-vehicle warning as one vehicle approaches another. In such a case, the vehicle safety device and the corresponding warning module mounted on the vehicle can also be implemented integrated. Preferably, the control unit of the warning module is implemented such that the warning module initially receives a signal from the vehicle safety device and outputs a warning signal based on this signal when the warning module is located within the warning zone. For example, it can be provided that the vehicle safety device notifies the warning module by means of a corresponding signal when it is located in the warning zone, so that the warning module then outputs a corresponding warning signal.

In a preferred embodiment of the safety system, the vehicle safety device is implemented to transmit a configuration of the warning zone to the warning module when it is located within range of the antenna unit. As soon as the warning module comes within range of the antenna unit, the vehicle safety device notifies the warning module about the current configuration of the warning zone. The warning module is preferably implemented to store the configuration of the warning zone and to determine whether or not the warning module is located in the warning zone based on this configuration and the signal of the antenna unit by means of the control unit of the warning module. The warning module outputs a warning signal when the warning module is located in the warning zone. The determination as to whether or not the warning module is located in the warning zone is thereby made efficient.

Furthermore, it is preferred that the vehicle safety device is implemented to transmit the relative position of the warning module to the antenna unit to the warning module. In this embodiment, it is not necessary that the warning module itself determines its position, but rather that the warning module receives its position notified by the vehicle safety device. This is particularly preferred when the warning module is portable, since it is then usually battery operated. In order to reduce the energy consumption here and thus to increase the operating time, it is preferred that only the vehicle safety device determines the position of the warning module and notifies the warning module of this position. If the warning module has previously received the configuration of the warning zone, the warning module can independently determine whether it is located in the warning zone or not. A warning signal can then possibly be output based on the result.

It should be understood that the vehicle safety device according to the first and second consideration of the invention have identical and similar considerations, as are particularly set forth in the dependent claims. Reference is thus made in full to the above description of the first consideration of the invention. According to a third consideration of the invention, the object mentioned previously is achieved by a warning module having a control unit and an antenna, for use in a safety system according to one of the above-described preferred embodiments of a safety system according to the second consideration of the invention.

The warning module accordingly comprises a control unit and an antenna which are adapted to the antenna unit of the vehicle safety device, wherein the warning module is implemented to output a warning signal when it is determined that the warning module is located within the warning zone. It should be understood that the warning module according to the third consideration of the invention comprises the same and similar sub-considerations as the vehicle safety device according to the first consideration of the invention and the safety system according to the second consideration of the invention, and in this respect, for the preferred embodiments and advantages of the warning module, reference is made in particular to the above description of the safety system according to the second consideration of the invention.

In a fourth consideration, the invention achieves the aforementioned object by a vehicle system having a vehicle and a vehicle safety device according to one of the above-described preferred embodiments in a vehicle safety device according to the first consideration of the invention. Thus, according to the fourth consideration of the invention, a vehicle safety device is mounted on the vehicle so that the vehicle is secured.

In a fifth consideration, the invention achieves the above-mentioned object in a method for warning persons in traffic having the steps: Defining a warning zone at least partially around a vehicle; monitoring of the warning zone by means of radio; determining whether a warning module is located within the warning zone; and determining the position of the warning module within the warning zone. It should be understood that the method according to the fifth consideration of the invention comprises the same and similar sub-considerations as the first four considerations of the invention, and to that extent reference is made in its entirety to the above description.

Preferably, the step of defining the warning zone comprises: Accessing a configuration of the warning zone pre-stored in a control unit; using the pre-stored configuration to define the warning zone. Preferably, a standard warning zone is pre-stored in a control unit and after starting a system, this configuration of the warning zone is called up. Preferably, a plurality of warning zone configurations is pre-stored and, depending on the situation, a corresponding configuration for defining the warning zone is selected.

Preferably, the step defining the warning zone comprises: detecting or determining at least one of the following parameters: driving speed, direction of travel, location, vehicle load, time of day, relative speed to the warning module, seat contact switch, steering angle, temperature, vehicle wheel slip, ABS signal; and changing the configuration of the warning zone based on the at least one detected or determined parameter. It is thus possible that, depending on the situation, a corresponding warning zone configuration is selected and the warning zone is defined accordingly. As a result, safety is increased and a false alarm is largely avoided.

Further, in a sixth consideration, the invention achieves the above-mentioned object through a computer program product comprising code means implemented, when executed on a computer, to execute the above-described method according to the fifth consideration of the invention.

In a seventh consideration, the object previously mentioned is achieved by a use of the vehicle safety device according to the first consideration of the invention in an industrial truck, in particular a forklift, a mining vehicle, a construction vehicle or a forestry vehicle.

BRIEF DESCRIPTION OF THE DRAWINGS

In the following, the invention is explained in more detail using embodiment examples with reference to the associated figures. Shown are.

DETAILED DESCRIPTION

Figure 1:
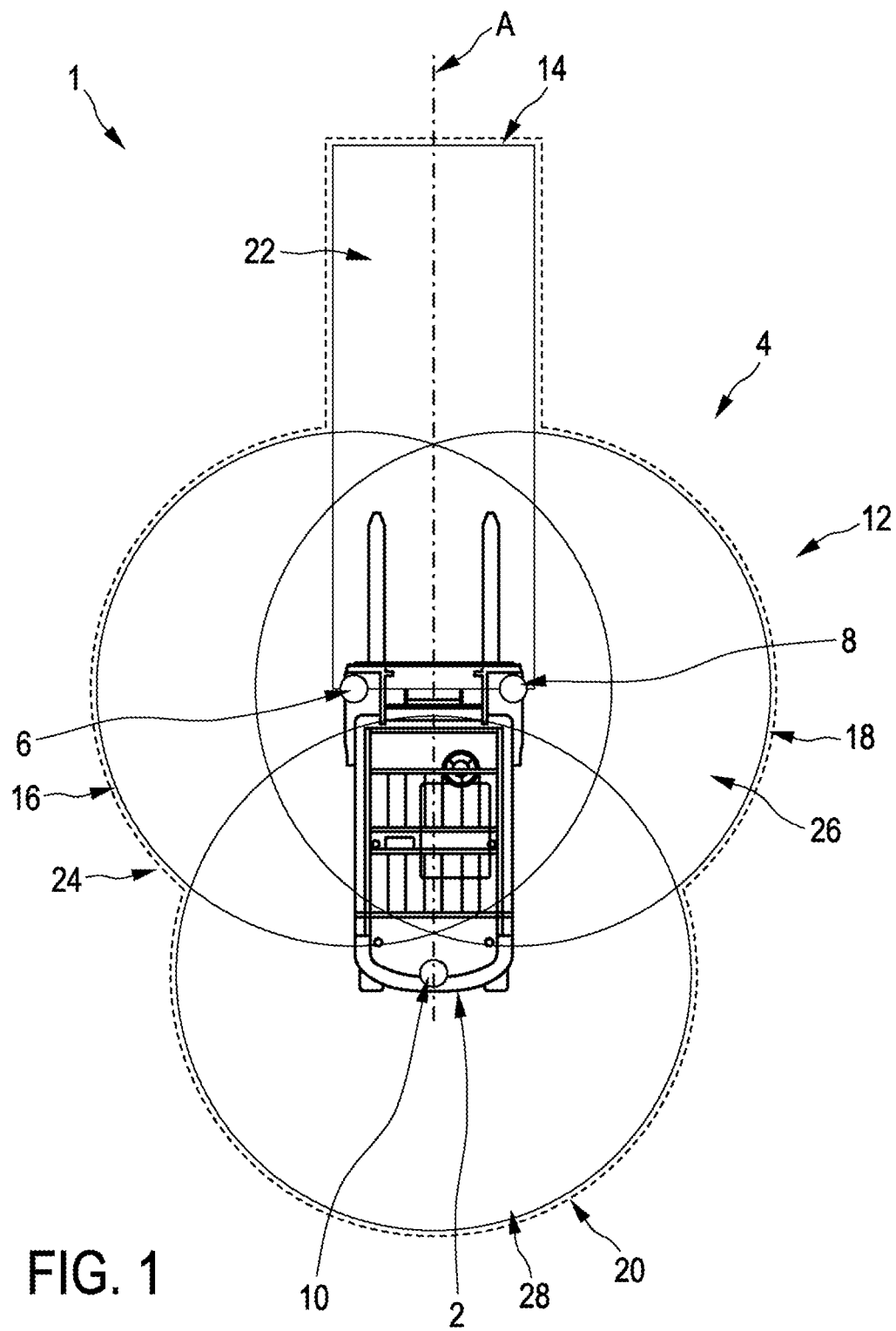
FIG. 1 a schematic plan view of a vehicle system having a vehicle and a vehicle safety device.

According to FIG. 1, a vehicle system 1 comprises a vehicle 2 and a vehicle safety device 4. The vehicle 2 is shown here from above and in the form of a forklift. Forklifts are widely used and it has directly been shown that accidents occur relatively frequently. Therefore, it is preferable to directly equip forklifts with the vehicle safety device 4 according to the invention. The vehicle safety device 4 according to the first embodiment (FIGS. 1 to 3) comprises a first antenna 6, a second antenna 8, and a third antenna 10. The first and second antennas 6, 8 in this case are disposed at the left and right corners of the front of the vehicle 2, and the third antenna 10 is disposed at the rear of the vehicle 2. Together, the first, second and third antennas 6, 8, 10 form an antenna unit 12. The antenna unit 12 monitors a warning zone 14, which is shown here by the dashed line. All three antennas 6, 8, 10 each span a spherical radio field 16, 18, 20, which is illustrated schematically by the circles. The circles illustrate only the radio field 16, 18, 20, but it should be understood that the actual range of the antennas 6, 8, 10 is much larger and in reality is up to 200 m. However, account is to be taken of shielding effects that can be caused by the vehicle 2 or a corresponding load of the vehicle.

According to this embodiment, the warning zone 14 comprises a frontal section 22 which extends from the vehicle front substantially in the direction of a longitudinal axis A of the vehicle 2 in the direction of travel along the longitudinal axis A. Furthermore, the warning zone 14 comprises two side sections 24, 26 and a rear section 28. The sides and rear sections 24, 26, 28 are made narrow compared to the frontal section 22. The vehicle 2 will normally move forward in the direction of travel, so that the sides and the rear zones 24, 26, 28 can be made narrow. The warning module 30 will only output a corresponding warning signal when a corresponding warning module 30 (see FIG. 2) is within the warning zone 14. At the same time, a display unit (see FIG. 9) of the vehicle safety device 4 will output a corresponding warning signal.

Figure 2:
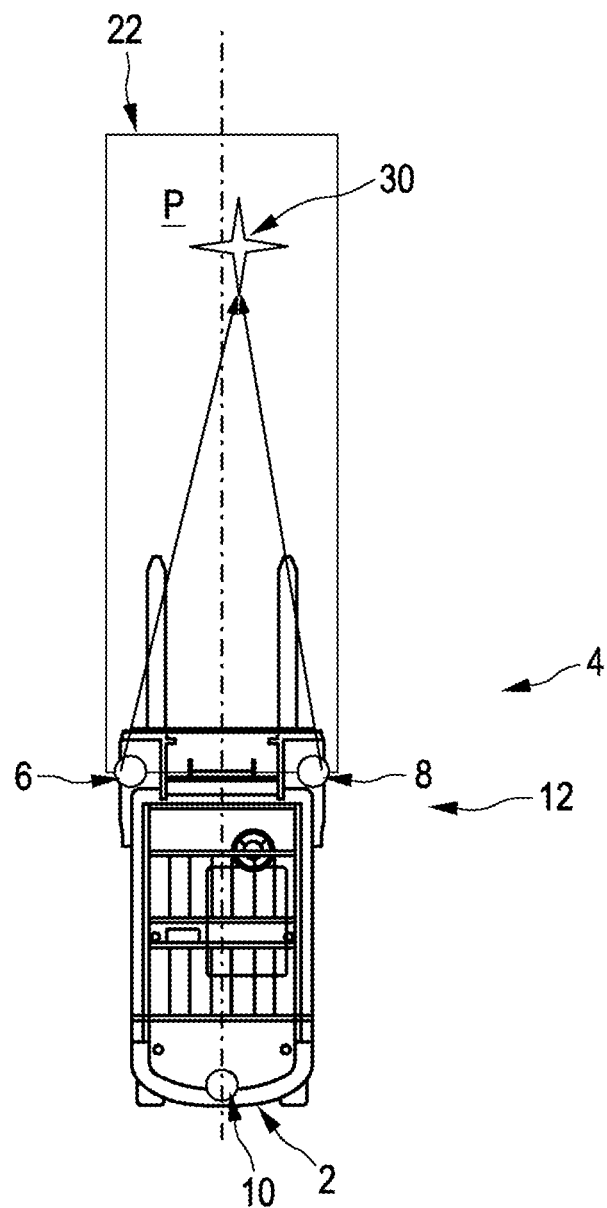
FIG. 2 the vehicle system of FIG. 1 having a warning module within the warning zone.

Due to the three antennas 6, 8, 10, it is possible to determine the position P of a warning module 30 (see FIG. 2) within the warning zone 14 (see FIG. 2, only the frontal section 22 shown). This makes it possible to output a targeted warning and false warnings are avoided.

Figure 3:
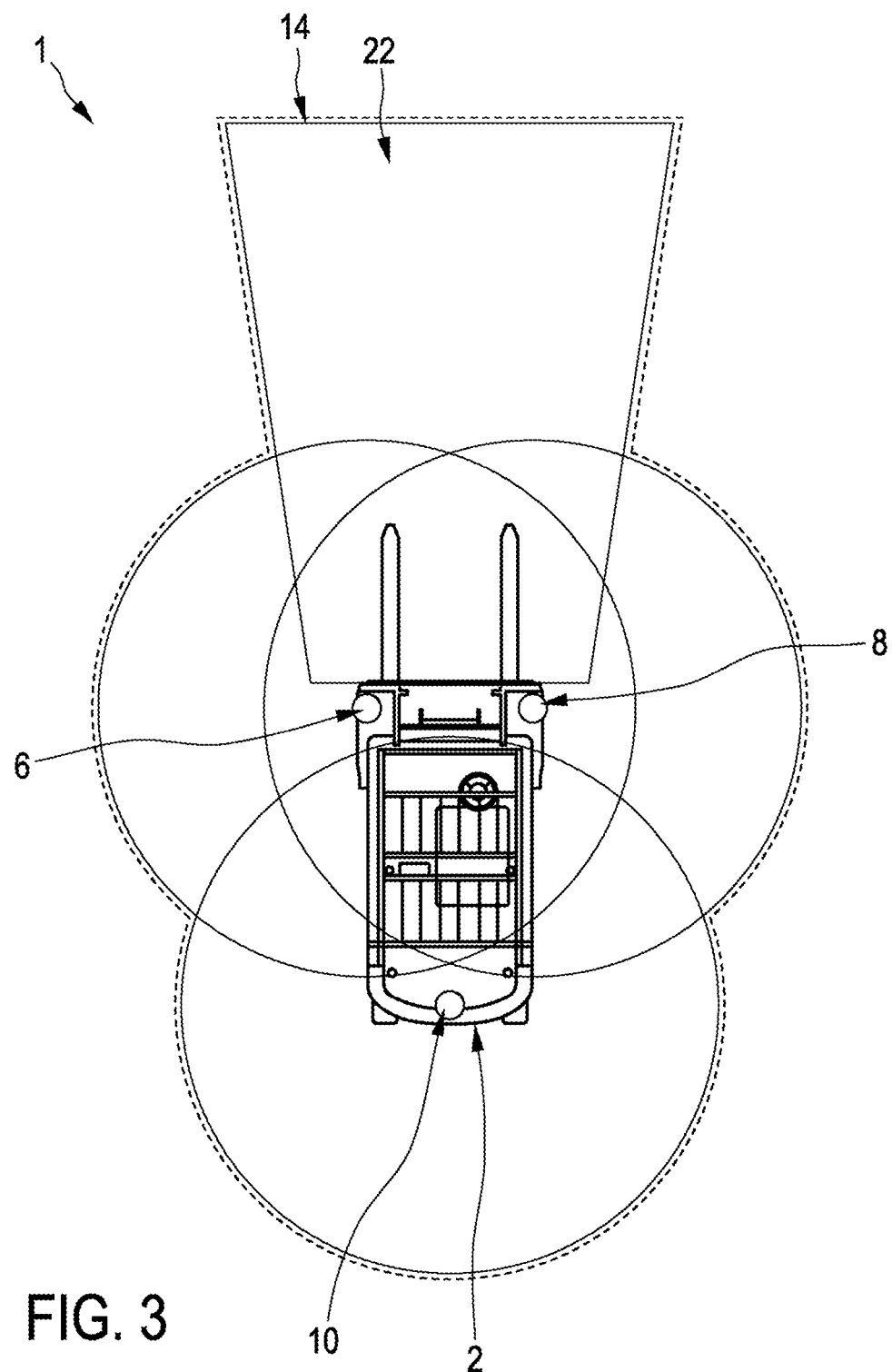
FIG. 3 the vehicle system of FIGS. 1 and 2 having the warning zone of a second configuration.

A particular consideration of the present invention is that the warning zone 14 is monitored by at least three antennas 6, 8, 10, wherein the warning zone 14 is at least partially within the range of the three antennas 6, 8, 10. As a result, the warning zone 14 can be adapted dynamically to changing environmental conditions. FIG. 3 shows such an example. Here, a vehicle system 1 according to FIG. 1 is shown, wherein the warning zone 14 is defined in a second configuration. The difference between the warning zone configuration according to FIG. 3 and the warning zone configuration according to FIG. 1 lies in the fact that the frontal section 22 is trapezoidal widening in the direction of travel. In FIG. 1, the frontal section 22 is substantially rectangular. A configuration as shown in FIG. 1 is advantageous in particular when predominantly driving straight-ahead is expected. The configuration according to FIG. 3 lends itself in particular to higher speeds and/or unsafe direction of travel. As a result, the warning zone 14 is slightly larger overall and thus the region in which a warning signal is output to a warning module 30 is also greater.

Figure 4:
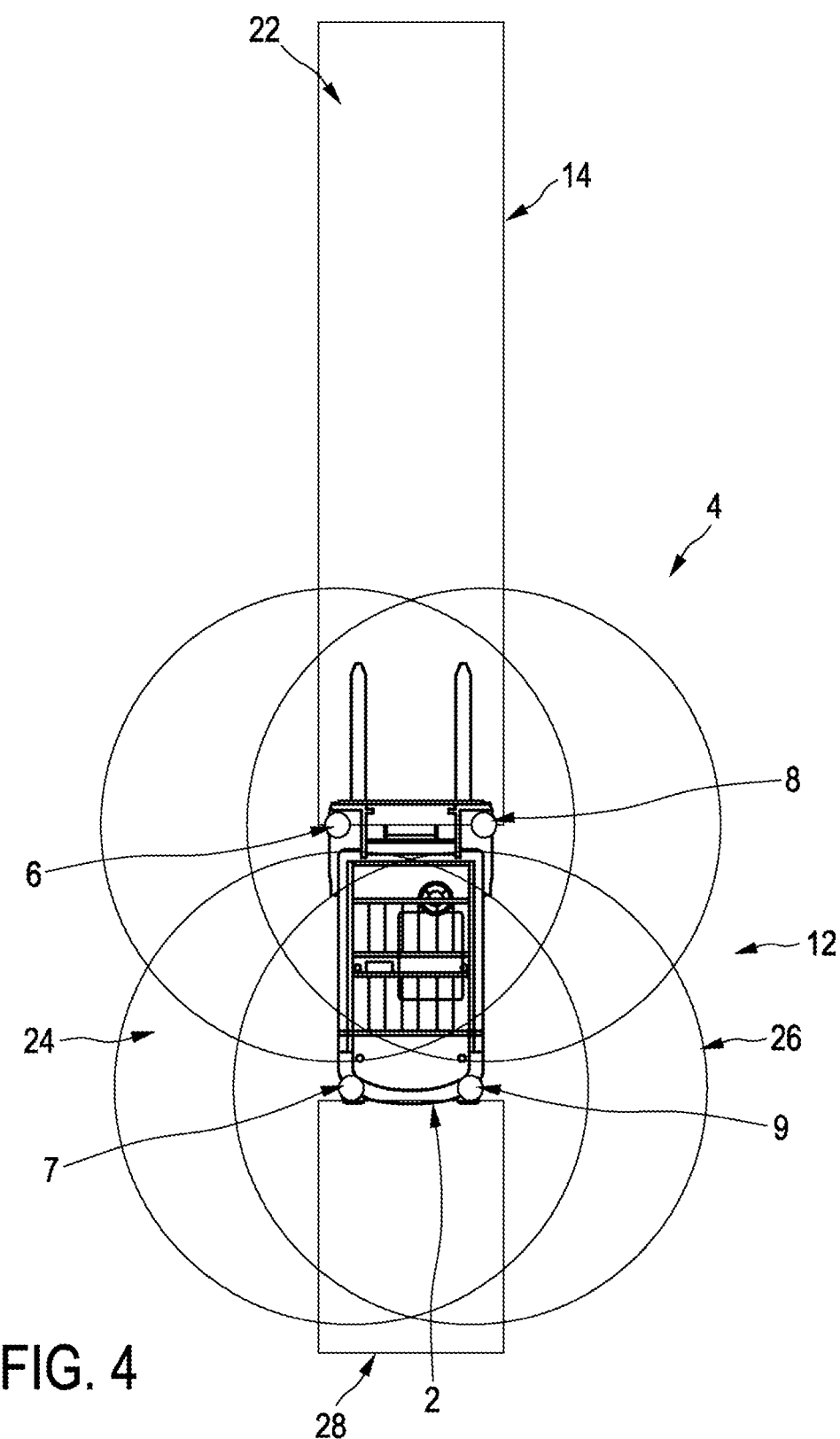
FIG. 4 a second embodiment of a vehicle system according to the invention.

According to FIG. 4, a further embodiment of a vehicle system 1 is shown and the same and similar elements are provided with the same reference numerals. Reference is thus made in full to the above description of the FIGS. 1 to 3.

The vehicle system 1 according to FIG. 4 comprises four antennas 6, 8, 7, 9 on the vehicle 2, which are used to monitor the warning zone 14. In addition, another antenna can be provided for muting. In contrast to the first embodiment, according to this embodiment (FIG. 4), two antennas 7, 9 are disposed at the rear of the vehicle, and also at corners, so that the four antennas 6, 8, 7, 9 span a rectangle overall. FIG. 4 also shows a warning zone configuration, as is preferred for high speeds. The frontal section 22 of the warning zone 14 is designed to be very long in the direction of travel and comprises about 2.5 times the vehicle length. This makes it possible to ensure sufficient time for braking even at high speeds and thus high approach speeds to a warning module 30. Furthermore, in contrast to the first embodiment (FIGS. 1 to 3), the rear section 28 of the warning zone 14 is also substantially rectangular. Such a configuration is also advantageous in frequent reverse travel. It should be understood that a warning zone configuration as in FIGS. 1 to 3 can also be implemented with the embodiment according to FIG. 4. It is only important that the antennas 6, 8, 7, 9, 10 cover a region overall and that a freely defined warning zone 14 can be monitored.

Figure 5:
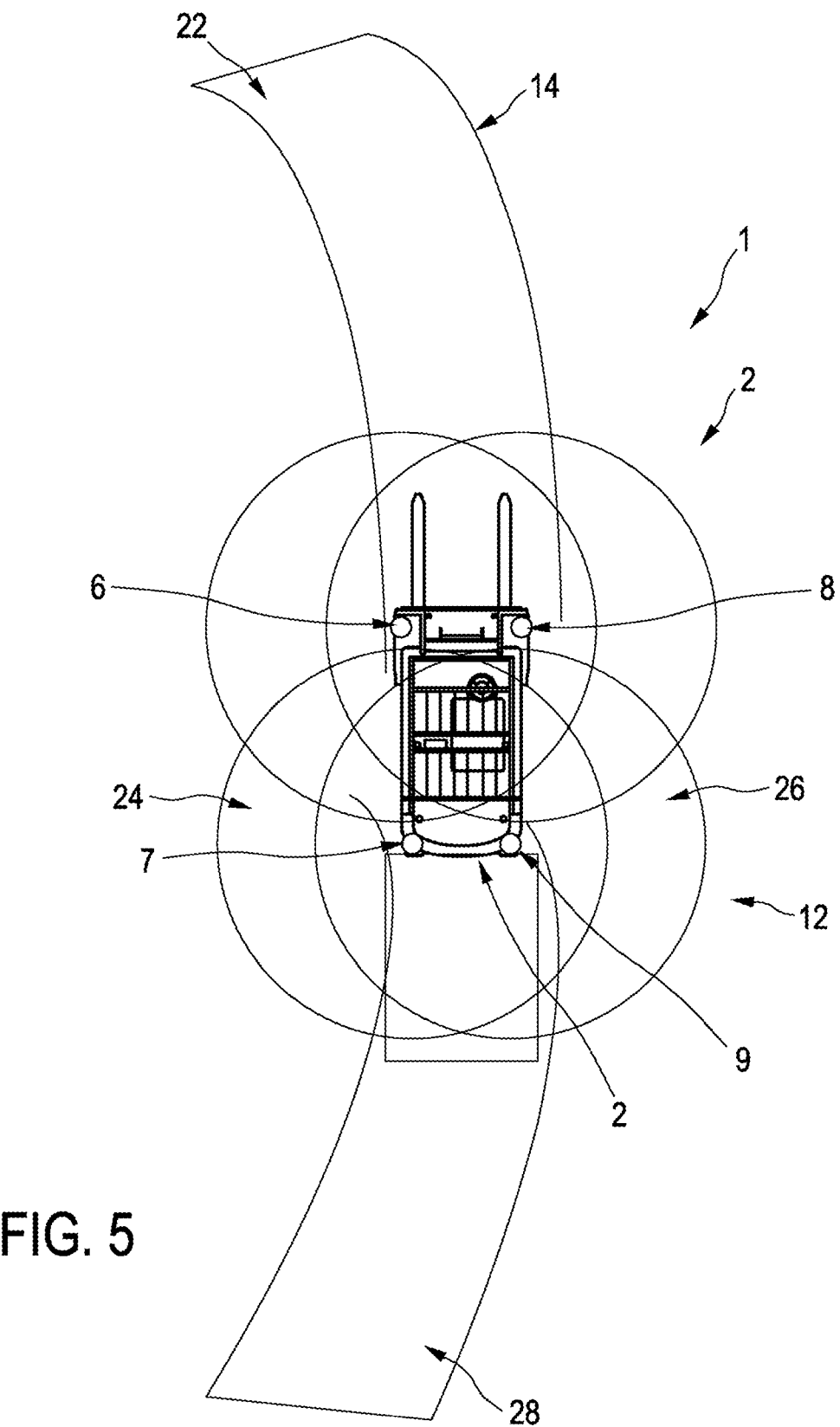
FIG. 5 the vehicle system of FIG. 4 having a second warning zone configuration.

The warning zone configuration according to the invention is adaptable to changing environmental conditions. Thus, FIG. 5 shows how the warning zone 14 preferably changes when cornering of the vehicle 2 is expected, for example, due to a steering angle or a navigation instruction of a navigation system. If the vehicle 2 according to FIG. 4 is expected to turn to the left in the direction of travel, the configuration of the warning zone 14 changes such that the frontal section 22 and the rearward section 28 are correspondingly curved rectangles so as to cover a region in which the vehicle 2 will move when cornering. This is illustrated in FIG. 5. When comparing FIGS. 4 and 5, it can be seen that a warning module 30 which is disposed offset to the left from the vehicle 2 is not necessarily detected in a warning zone configuration as shown in FIG. 4. In the configuration of the warning zone 14 according to FIG. 5, the elongated frontal section 22 lies in the direction of travel, and thus warning modules 30 can be detected in the travel path in a simple manner and a warning can be output.

Figure 6:
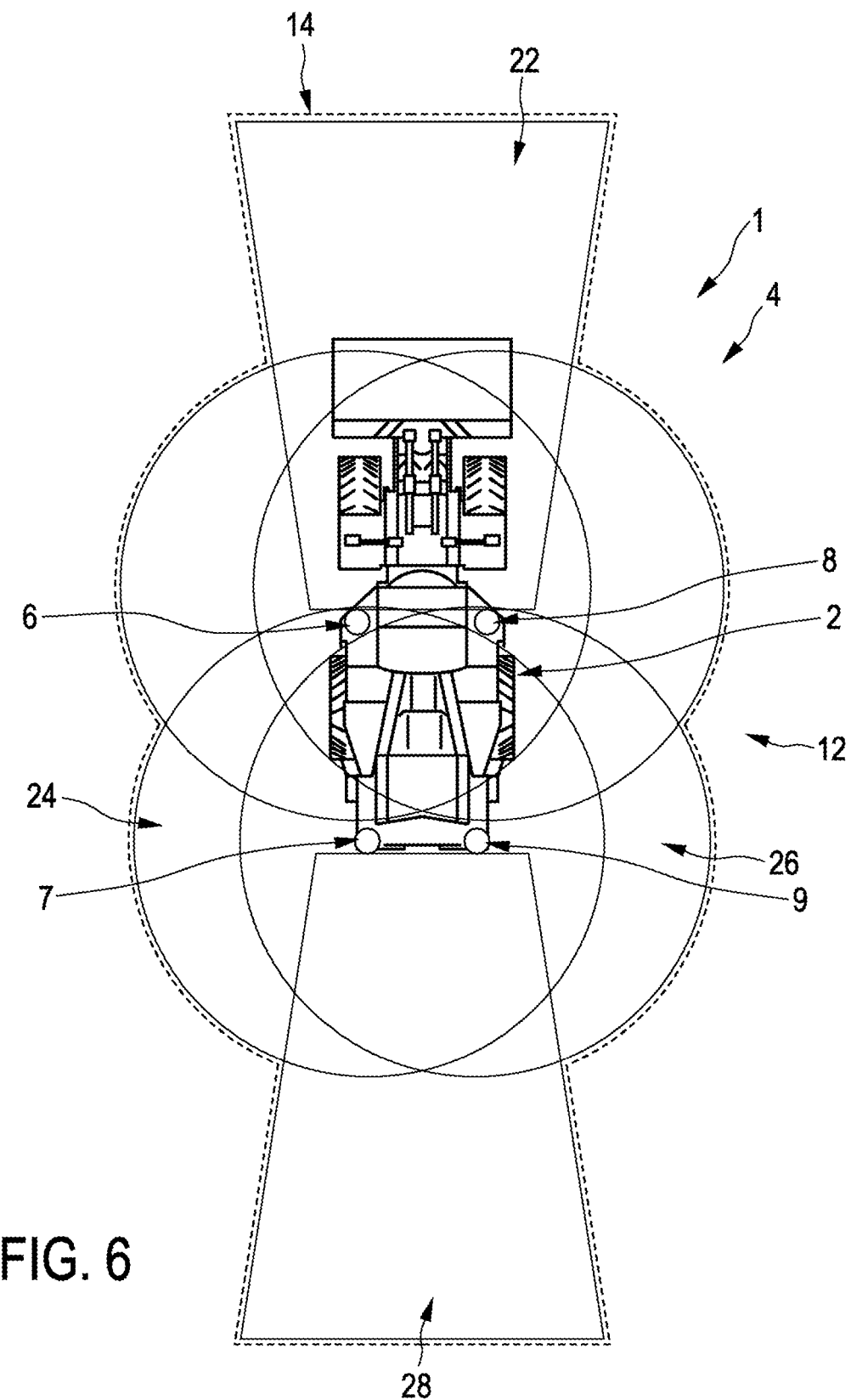
FIG. 6 a plan view of a vehicle system according to a further embodiment having a wheel loader.

The embodiment according to FIG. 6 differs from the previous embodiments in particular in that the vehicle system 1 comprises a wheel loader as the vehicle 2. The wheel loader 2 according to this embodiment (FIG. 6) is again provided with four antennas 6, 8, 7, 9, which are disposed on two front edges and two rear edges. The warning zone 14 is configured so that both the frontal section 22 and the rear section 28 is trapezoidal widening in the respective directions of travel. In this case, the rear section 28 is somewhat longer in the reverse travel direction than the frontal section 22 in the forward direction. The warning zone 14 is therefore adapted in this embodiment (FIG. 6) to the particular conditions and purposes of a wheel loader. A wheel loader frequently makes turns to transport overburden and move it from a job site to a transport vehicle. The warning zone 14 is configured in this way to take these frequent cornerings into account, and in particular the frequent reverse driving. With regard to the further design options, reference is made to the above description. Also in this embodiment, it is possible to change the configuration of the warning zone 14, particularly as a function of the vehicle speed, environmental conditions and the like.

Figure 7:
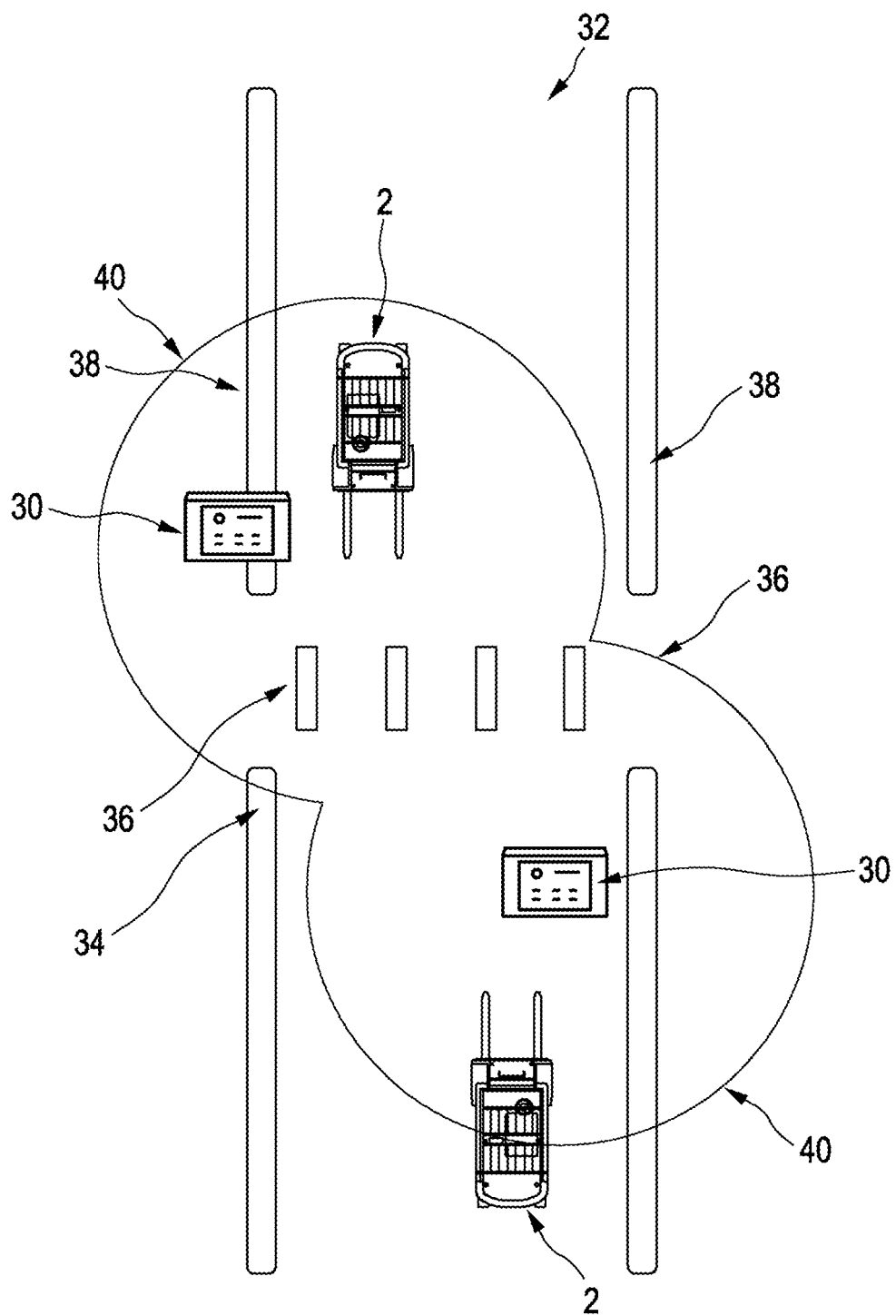
FIG. 7 a schematic representation of two vehicle systems in a passageway in a hall at a pedestrian crossing and two corresponding static warning modules.

FIG. 7 shows an application for two stationary warning modules (FIG. 7, both denoted by 30). Schematically, a passageway 32 on which two vehicles 2 travel in opposite directions is shown. A pedestrian crossing 34 is approximately in the middle of FIG. 7. The pedestrian crossing 34 is defined by two passages 36 in walls 38 that define the passageway 32. Stationary warning modules 30 are disposed in the direction of travel, in each case in front of the pedestrian crossing 34, and their radio range 40 is shown schematically in FIG. 7. The warning zones 14 of the vehicles 2, which are equipped with a corresponding vehicle safety device 4, are not shown in FIG. 7, but can be implemented accordingly in FIGS. 1 to 6. If a vehicle 2 now travels toward a warning module 30 in such a way that the warning module enters the warning zone 14 of the vehicle, a warning signal is output to the warning module and/or to a corresponding display unit 50 of the vehicle safety device 4 on the vehicle 2. At the same time, it can be provided that a signal is output from the vehicle safety device to a vehicle control, so that the vehicle 2 is braked or the speed is limited to a maximum value. The pedestrian crossing 34 is secured as a result. Even persons who want to cross the pedestrian crossing 34 are able to perceive the signal output by the warning module 30 and are thus warned of an approaching vehicle 2.

Figure 8:
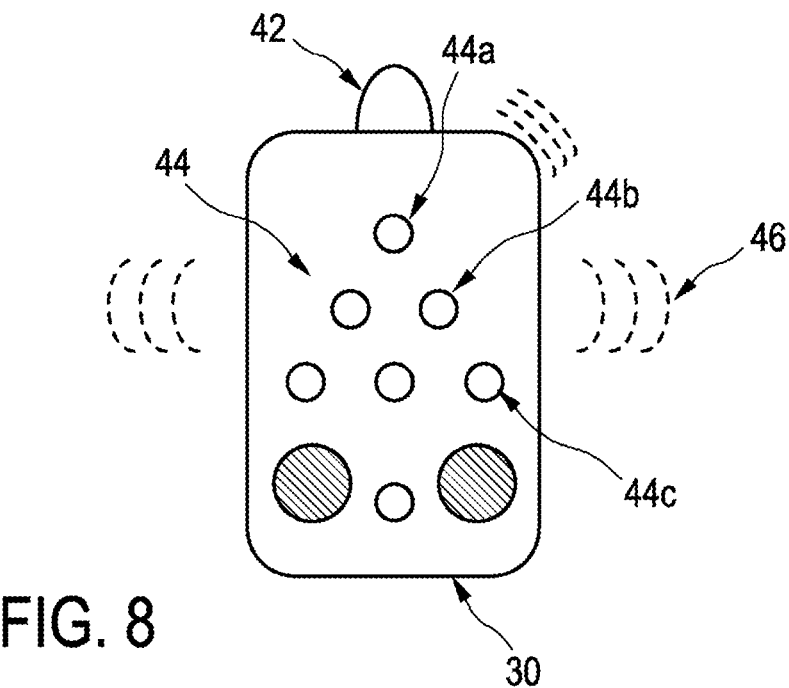
FIG. 8 a schematic representation of a portable warning module.

In a variant, the warning module 30 is implemented to be portable. This is shown schematically in FIG. 8. The portable warning module 30 comprises an antenna 42 and a plurality of warning lights 44a, 44b, 44c (only three provided with reference numerals, overall designated 44). These are disposed in the form of a warning triangle. Further, the warning module 30 is provided with a vibration unit so that the portable warning module 30 can be set into vibration as indicated by the vibrations 46. The warning signal output by the warning module 30 is thus both visually detectable according to this embodiment, when the warning lights 44 are switched on, as well as haptically detectable when the warning module 30 is set into vibration. Preferably, the warning module 30 is worn on the body by a person.

Figure 9:
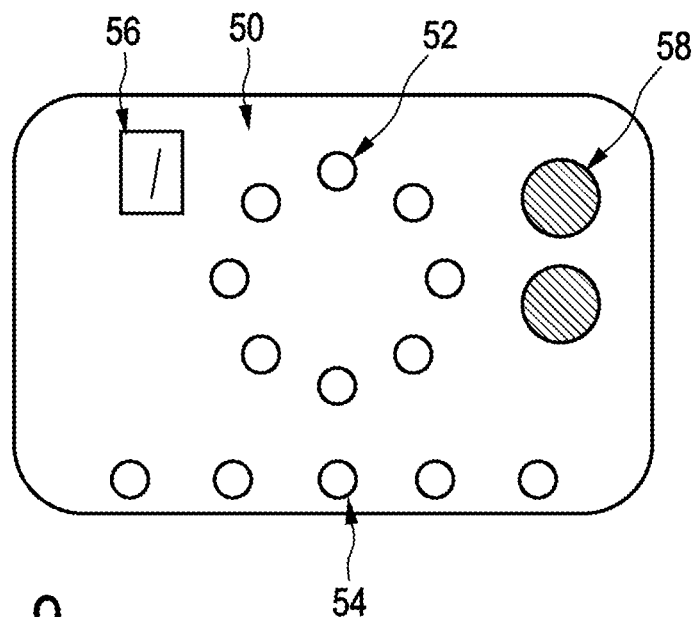
FIG. 9 a schematic representation of a display unit of a vehicle safety device.

FIG. 9 illustrates a display unit 50 of a vehicle safety device 4. The display unit 50 is preferably mounted in the cockpit of the vehicle 2 on which the vehicle safety device 4 is disposed. The display unit 50 is used to indicate to a driver of the vehicle 2 in which direction and how far away a warning module 30 is located with respect to the antenna unit 12 of the vehicle safety device 4. For this purpose, the display unit 50 comprises a plurality of LEDs 52 (only one provided with reference numerals in FIG. 9), which are disposed in a ring. It can be provided that when a warning is output, all the LEDs 52 light up together. Alternatively, the ring is used to indicate in which direction a corresponding warning module 30 is located. A vehicle 2, in which the display unit 50 is positioned, forms in this variant the centre of the ring 52 and, for example, when the uppermost LED 52 in FIG. 9 lights up, this indicates that the corresponding warning module is located frontally in front of the vehicle 2. Five further LEDs 54 are disposed in a row in the lower region. These LEDs 54 can be used to indicate, in addition to the direction, the distance in which the warning module 30 is located. If, for example, only the leftmost LED 54 in FIG. 9 lights up, this means that the warning module 30 is relatively far away. However, if the rightmost LED 54 lights up, this means that the warning module 30 is relatively close to the vehicle 2. The display unit 50 further comprises a digital display 56 in which the number of warning modules 30 located within the warning zone is indicated. It is thus conceivable, for example, that a group of persons is detected, all of whom carry a warning module 30. The corresponding number is then displayed in the display 56. A switch-on button is indicated with 58, with which the vehicle safety device 4 can be switched on or off.

In addition, the display unit 50 comprises an acoustic warning device, which is not shown separately. Due to the three antennas 6, 7, 8, 9, 10 of the antenna unit 12, it is possible to determine the exact position P of a warning module 30 with respect to the antenna unit 12 and to display this position P accordingly by lighting up the corresponding LEDs 52.

Figure 10:
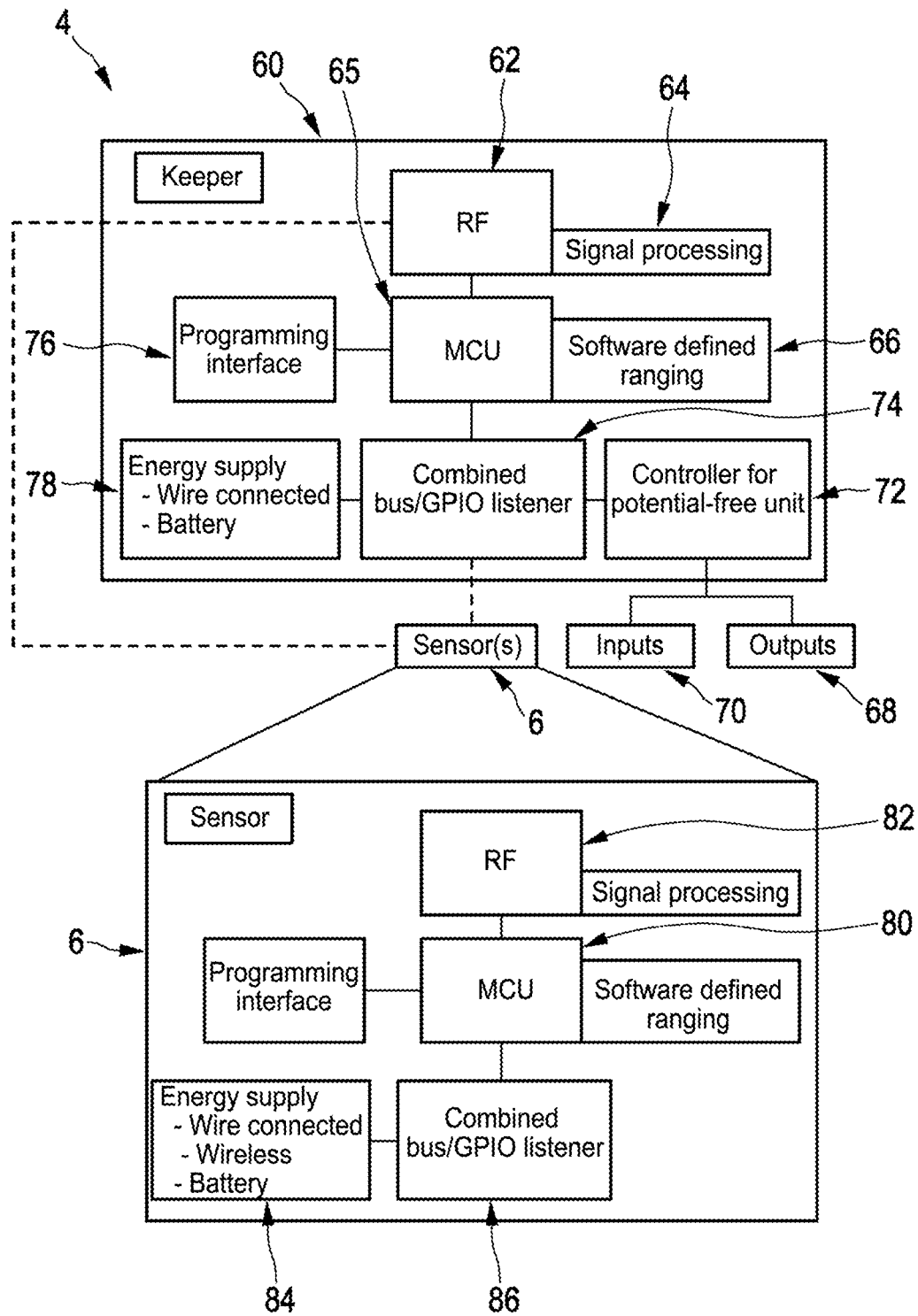
FIG. 10 a schematic setup of the construction of a vehicle safety device.

FIG. 10 now illustrates the internal construction of the vehicle safety device 4. The vehicle safety device 4 comprises a control unit 60 which can be mounted at a central position on the vehicle 2. The control unit 60 is, in turn, connected to a plurality of antennas 6, 8, 10 (also referred to as "sensor" in FIG. 10). FIG. 10 shows only an antenna 6. The control unit 60 comprises a high-frequency converter 62 having a corresponding signal processing unit 64 for connection to the antennas 6. The corresponding signals are given to the antenna 6 and received via the high-frequency converter 62. This is controlled by a microcontroller 65. The microcontroller 65 comprises a software module 66, by means of which the warning zone 14 is defined. A memory unit is further provided in the microcontroller 65, in which memory unit predetermined configurations for warning zones 14 are stored. Via corresponding inputs and outputs 68, 70, the control unit 60 can be connected or is connected to a central vehicle control and can provide signals, such as vehicle speed, steering angle, seat sensor, brake sensors and the like to the microcontroller 65 via a corresponding controller 72 and an internal bus 74. The microcontroller 65 then defines a corresponding warning zone based on these values.

It is also possible for an operator to program the warning zone 14 himself. A corresponding interface 76 is provided for this purpose. Thus, for example, a notebook or the like can be connected to the control unit 60 and an operator can define a warning zone 14 himself via a corresponding interface.

Furthermore, the control unit 60 is coupled with a power supply 78 which also provides power to the antenna unit 12.

The antennas 6, 7, 8, 9, 10 are likewise each equipped with a circuit board which comprises corresponding components, such as the control unit 60. Thus, the antennas 6, 7, 8, 9, 10 also comprise a microcontroller 80, a high-frequency converter 82, a power supply 84 and an internal bus 86. Information about the warning zone 14 is passed from the microcontroller 65 to the microcontroller 80 in the antennas.

Figure 11:
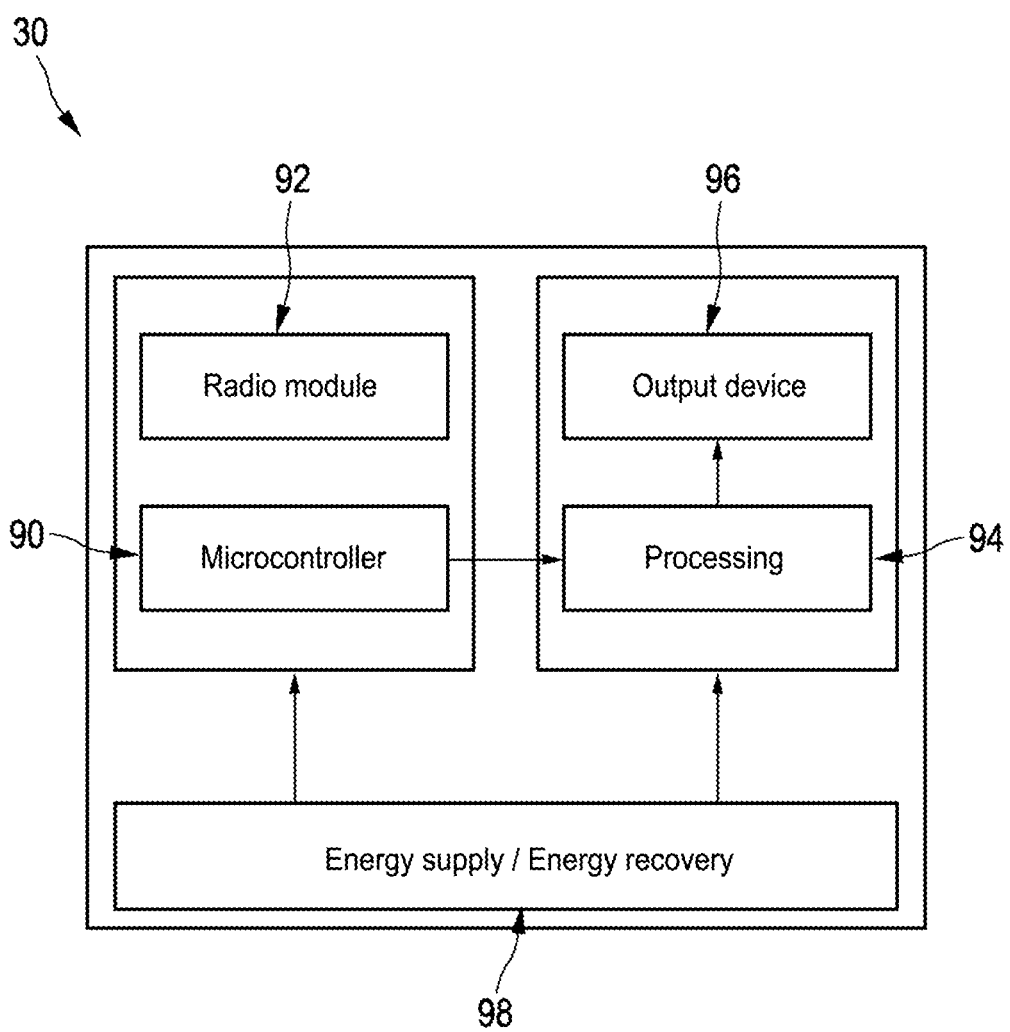
FIG. 11 a schematic setup of the construction of a warning module.

According to FIG. 11, a corresponding schematic illustration of a warning module 30 is shown. This likewise comprises a microcontroller 90 which comprises a corresponding radio module 92, which is coupled to the antenna 42 (see FIG. 8). The radio module 92 is matched to the antennas 6, 7, 8, 9, 10 of the vehicle safety device 4. The microcontroller 90 is coupled with a corresponding processing unit 94 that is set up to determine whether or not the warning module 30 is located within the warning zone 14. If the warning module 30 receives the configuration of the warning zone 14 from the vehicle safety device 4 and by cooperation of the radio module 92 with the antennas 6, 7, 8, 9, 10, a distance between warning module 30 and the antenna unit 12 can be overruled. If the processing unit 94 then determines that the warning module 30 is located within the warning zone 14, a corresponding warning signal is output via the output device 96. The warning module 30 is also coupled with a power supply 98. This can also, as described in WO 2011/151291 A1, be provided with an energy recovery device that can provide electrical energy based on, for example, vibrations or the like.

Figure 12:
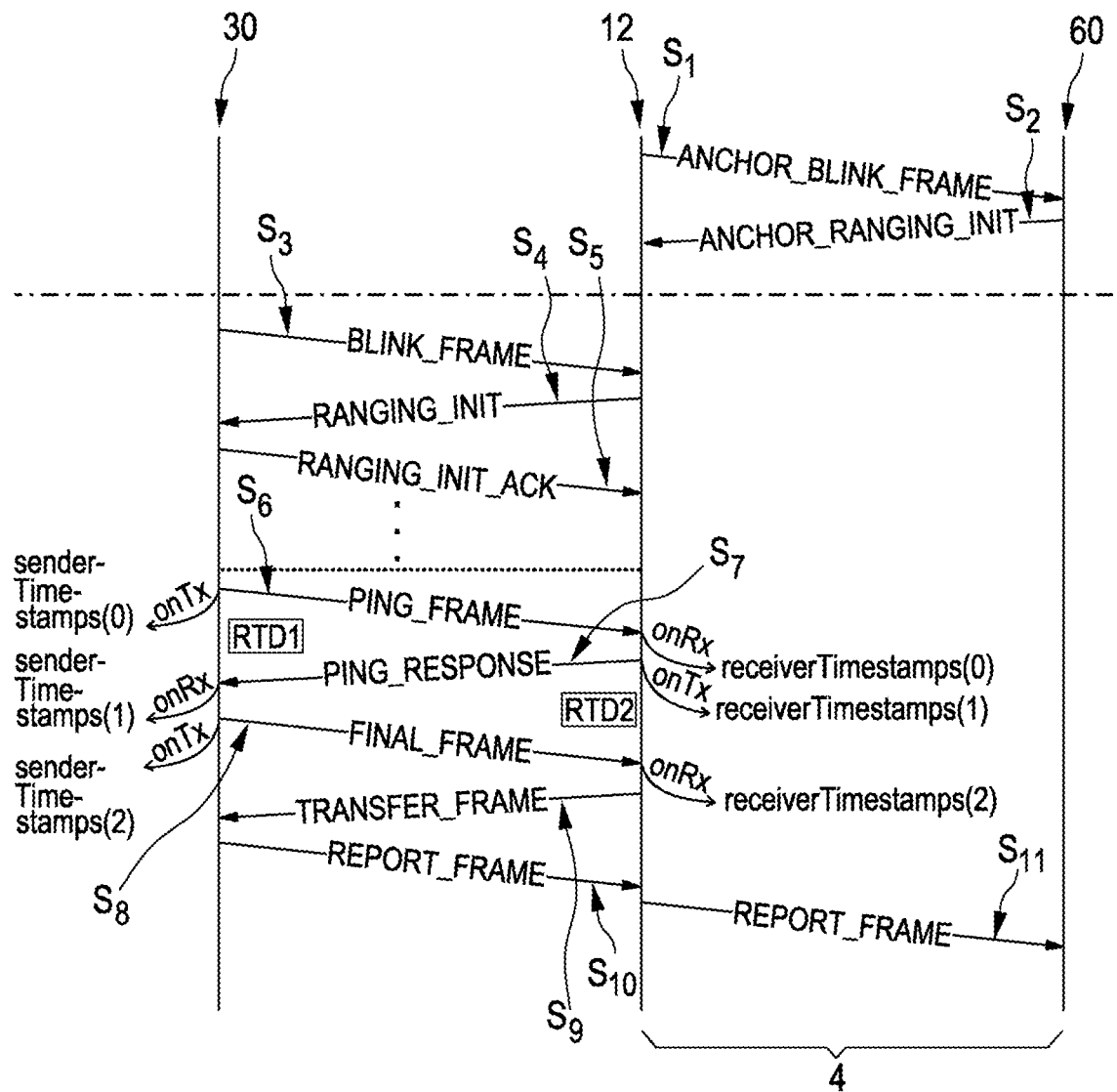
FIG. 12 a flowchart illustrating the communication between the vehicle safety device and the warning module.

Finally, FIG. 12 illustrates the communication between the vehicle safety device 4 and the warning module 30. First, the operational readiness of the antenna unit 12 is reported to the control unit 60 in a first signal S1 and the control unit 60 reports the defined warning zone 14 to the antenna unit 12 in a signal S2.

If a warning module 30 now comes into the region covered by the antenna unit 12, the antenna unit 12 receives a flashing signal S3 of the warning module. The warning module 30 permanently transmits such flashing signals to make itself noticeable with respect to vehicle safety devices 4. After receiving a flashing signal S3, the antenna unit 12 transmits the configuration of the warning zone 14 in a signal S4 to the warning module 30. The warning module 30 then transmits back in signal S5 that it has received the configuration of the warning zone 14.

The warning module 30 transmits a ping signal in signal S6 with a time stamp that is received by the antenna unit 12. The antenna unit 12 then transmits a corresponding ping signal S7 with its own time stamp. From these two timestamps, the microcontroller 90 of the warning module 30 can determine whether the warning module 30 is located within the warning zone 14 that was notified in signal S4. The distance from the warning module 30 to the antenna unit 12 determined by the warning module 30 is communicated to the antenna unit 12 in signal S8, which antenna unit subsequently confirms the warning zone 14 again in signal S9. In signal S10, the warning module 30 then gives a message to the antenna unit 12 as to whether it is located within the warning zone 14. This is reported by antenna unit 12 to the control unit 60 in signal S11 and the control unit 60 processes this signal accordingly. Optionally, the warning module 30 and the control unit 60 output a corresponding warning signal.

The invention claimed is:

1. A vehicle safety device comprising:
an antenna unit comprising at least a first antenna, a second antenna, and a third antenna mounted apart from each other in a predetermined spatial relationship at predetermined positions on a vehicle to be safeguarded, each antenna generating an electromagnetic field; and
a control unit in electrical communication with the antenna unit, the control unit being configured to:
define a warning zone for the vehicle by selecting a geometric configuration of the warning zone from among a plurality of warning zone geometric configurations prestored in the control unit,
determine whether a warning module matched to the antenna unit is located within the warning zone, and
transmit the geometric configuration of the warning zone to the warning module as soon as the warning module is located within range of the antenna unit,
wherein the warning zone is within a portion of at least one of the electromagnetic fields of the antennas.

2. The vehicle safety device of claim 1, wherein the control unit is configured to determine the position of the warning module within the warning zone relative to the antenna unit.

3. The vehicle safety device of claim 2, wherein the control unit comprises a display device configured to display the position of the warning module.

4. The vehicle safety device of claim 1, wherein the control unit is configured to define the warning zone as a function of at least one of speed, direction of travel, location, load, time of day, relative speed to the warning module, seat contact switch, steering angle, temperature, wheel slip, or ABS signal.

5. The vehicle safety device of claim 1, wherein at least part of the warning zone is defined to extend longitudinally forward from the vehicle.

6. The vehicle safety device of claim 5, wherein the warning zone comprises a frontal section extending longitudinally forward in a substantially rectangular or trapezoidal manner.

7. The vehicle safety device of claim 5, wherein the warning zone comprises two side sections extending approximately in a range of 30 cm to 2.5 m from the vehicle.

8. The vehicle safety device of claim 1, wherein the control unit is further configured to output a warning signal in response to determining that the warning module matched to the antenna unit is located within the warning zone.

9. The vehicle safety device of claim 8, wherein the control unit is configured to be connected to a vehicle controller of the vehicle to be safeguarded and to output the warning signal to the vehicle controller to cause the vehicle to brake.

10. The vehicle safety device of claim 1, wherein the antenna unit further comprises a fourth antenna configured to define a safe region.

11. A safety system, comprising:
the vehicle safety device of claim 1; and at least one warning module matched to the antenna unit,
wherein the warning module comprises another control unit and another antenna which cooperates with the antenna unit, and
wherein the warning module is configured to receive a signal and to output a warning signal as soon as it is determined that the warning module is located within the warning zone.

12. The safety system of claim 11, wherein the vehicle safety device is configured to transmit, to the warning module, the relative position of the warning module to the antenna unit.

13. The safety system of claim 12, wherein the other control unit of the warning module is configured to determine whether the warning module is located within the warning zone based on the geometric configuration of the warning zone and the relative position.

14. A vehicle system, comprising:
a vehicle; and
the vehicle safety device of claim 1.

15. The vehicle system of claim 14, wherein the vehicle is an industrial truck, a forklift, a mining vehicle, a construction vehicle, or a forestry vehicle.

16. A method comprising:
defining a warning zone at least partially around a vehicle using a control unit by selecting a geometric configuration of the warning zone from among a plurality of warning zone geometric configurations prestored in the control unit, the control unit being in electrical communication with an antenna unit configured to generate at least one electromagnetic field, wherein the warning zone is within a portion of the at least one electromagnetic field;
monitoring the warning zone via radio;
determining whether a warning module is located within the warning zone;
transmitting, as soon as it is determined that the warning module is located within the warning zone, the geometric configuration of the warning zone to the warning module; and
determining the position of the warning module within the warning zone.

17. The method of claim 16, wherein defining the warning zone comprises:
detecting or determining at least one of speed, direction of travel, location, load, time of day, relative speed to the warning module, seat contact switch, steering angle, temperature, wheel slip, or ABS signal; and
changing the geometric configuration of the warning zone based on the at least one detected or determined parameter.

18. A storage device storing a computer program product comprising code that, when executed on a computer, effectuates operations comprising:
defining a warning zone at least partially around a vehicle using a control unit by selecting a geometric configuration of the warning zone from among a plurality of warning zone geometric configurations prestored in the control unit, the control unit being in electrical communication with an antenna unit configured to generate at least one electromagnetic field, wherein the warning zone is within a portion of the at least one electromagnetic field;
monitoring the warning zone via radio;
determining whether a warning module is located within the warning zone;
transmitting, as soon as it is determined that the warning module is located within the warning zone, the geometric configuration of the warning zone to the warning module; and
determining the position of the warning module within the warning zone.

19. A vehicle safety device for warning persons in traffic, the vehicle safety device comprising:
an antenna unit comprising a plurality of antennas mounted in a predetermined spatial relationship on a vehicle, each antenna of the plurality of antennas generating an electromagnetic field; and
a control unit in electrical communication with the antenna unit, the control unit being configured to:
define a warning zone for the vehicle by selecting a geometric configuration of the warning zone from among a plurality of warning zone geometric configurations prestored in the control unit,
determine whether a warning module matched to the antenna unit is located within the warning zone,
transmit the geometric configuration of the warning zone to the warning module as soon as the warning module is located within range of the antenna unit, and
continuously update the warning zone as a function of at least one of speed, direction of travel, location, load, time of day, relative speed to the warning module, seat contact switch, steering angle, temperature, wheel slip, or ABS signal,
wherein the warning zone is within a portion of at least one of the electromagnetic fields of the antennas.

20. A vehicle safety device comprising:
a high-frequency antenna unit comprising at least a plurality of antennas mounted in a predetermined spatial relationship on a vehicle, each antenna of the plurality of antennas generating an high-frequency electromagnetic field; and
a control unit in electrical communication with the antenna unit, the control unit being configured to:
define a warning zone for the vehicle by selecting a geometric configuration of the warning zone from among a plurality of warning zone geometric configurations prestored in the control unit,
determine whether a warning module matched to the antenna unit is located within the warning zone, and
transmit the geometric configuration of the warning zone to the warning module via the high-frequency antenna unit as soon as it is located within the high-frequency electromagnetic fields of the antenna unit,
wherein the warning zone is within a portion of at least one of the high-frequency electromagnetic fields of the antennas.

21. The vehicle safety device according to claim 20, wherein each high-frequency electromagnetic field is a field according to standard IEEE 802.15.4.

* * * * *